Nov. 1, 1932.  A. M. KROCZEK  1,885,359
BIRD CAGE
Filed Jan. 27, 1930
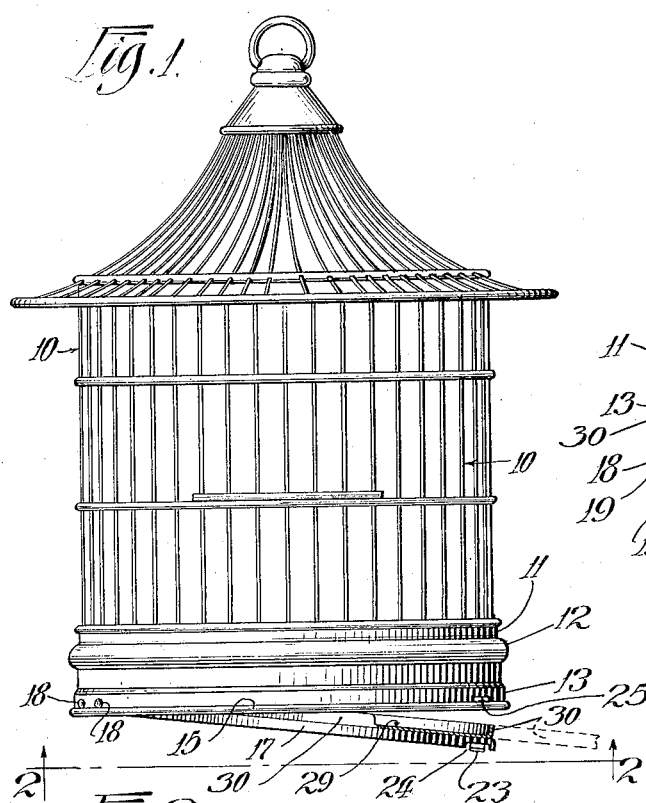
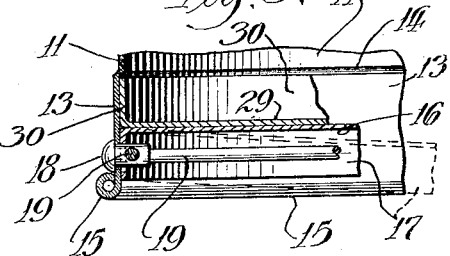
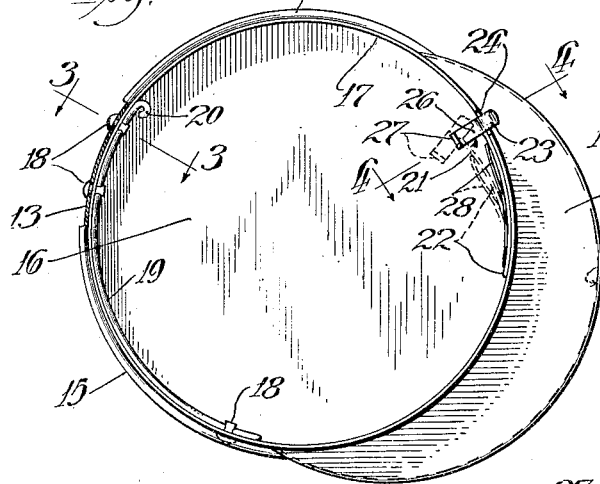
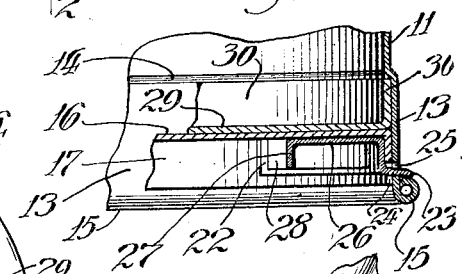
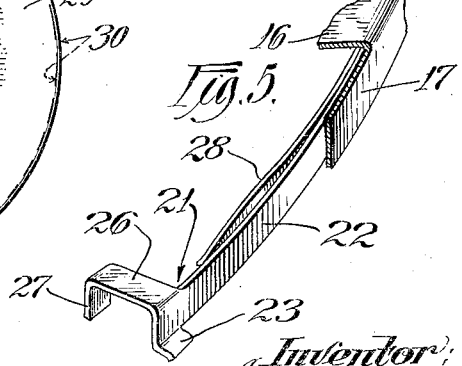

Patented Nov. 1, 1932

1,885,359

UNITED STATES PATENT OFFICE

ANTON M. KROCZEK, OF CHICAGO, ILLINOIS

BIRD CAGE

Application filed January 27, 1930. Serial No. 423,668.

This invention relates to bird cages, and it has for its principal object to produce a simple and practical bottom construction which is sanitary and possesses certain advantages and conveniences which will hereinafter more fully appear.

The invention consists in the novel construction and in the parts and combinations and arrangements of parts hereinafter described and set forth in the appended claims.

In the accompanying drawing, illustrating a practical adaptation of the invention,—

Fig. 1 is a side elevation of a bird cage, the bottom thereof being shown in opened condition and a portion of the removable tray or false bottom being broken away and shown in section;

Fig. 2 is an inverted plan view of the cage, looking in the direction of the arrows indicated on the line 2—2 of Fig. 1, the removable tray or false bottom being shown as partially removed;

Fig. 3 is a fragmentary section of the lower portion of the cage, on an enlarged scale, taken on or about the line 3—3 of Fig. 2;

Fig. 4 is a fragmentary section of the lower portion of the cage, similar to Fig. 3 but being taken on or about the line 4—4 of Fig. 2; and Fig. 5 is a detail perspective view of the latch element for the hinged cage bottom.

Referring now to the drawing, the numeral 10 designates generally the wire frame body of the cage, which may be of any ordinary construction except as to the bottom portion thereof, to which the present invention directly relates. The cage shown in the drawing is of the round type but, obviously, it may be of rectangular or other polygonal shape.

As shown, the cage body frame comprises a base ring or annulus 11 formed of sheet metal and suitably ribbed annularly, as at 12, for purposes of ornamentation as well as adding rigidity to the structure. As more directly concerns the present invention, the lower marginal portion 13 of this base ring or annulas 11 is offset outwardly so as to produce an annular internal shoulder 14 and, preferably, the extreme marginal portion of said member 11 is rolled or beaded, as at 15, to give further rigidity to the structure and to produce a blunt edge.

Hingedly mounted within the annular base member 11 is a circular bottom plate 16 having a depending marginal flange 17. The hinging of the bottom member 16 is preferably effected through the medium of headed studs 18 which are inserted from the outside through apertures provided therefor in the outwardly offset base portion 13, and through registered apertures provided therefor in the flange 17 of the bottom member 16, the apertures in the portion 13 being of substantially the same diameter as the studs so that the studs fit rather snugly therein, but the apertures in the flange 17 of the bottom member 16 being preferably of somewhat larger diameter than the studs so as to permit a swinging movement of the bottom 16, as will presently more fully appear.

The respective studs 18 are transversely apertured in a plane close to the inner face of the flange 17 of the bottom member 16, and inserted through said transverse apertures is a wire 19, preferably of a resilient character, said wire being looped at one end, as at 20, so as to afford a head for convenience in applying and removing said wire. By this arrangement, owing to the studs 18 loosely fitting the apertures in the flange 17 of the bottom member 16 and there being preferably allowance for slight play between the flange 17 and the wire 19, and due also to a certain degree of inherent resilience in the flange 17, the bottom member 16 is capable of being swung out of the annular frame member 11 to a limited degree, as shown more clearly in Fig. 1 of the drawing, and to which position said bottom member 16 may drop by its own weight or under the weight of a utensil or device which may be placed thereon within the cage, unless said bottom member 16 is supported by a latch device, which will now be described.

The latch device, designated generally by the numeral 21, comprises, as shown, an elongated body portion or tongue 22 which is secured at one end to the inner side of the flange 17 of the bottom member 16 by any approved or obvious method of attachment such as soldering, welding or riveting, as may be desired. At the opposite end of this tongue 22 is a lateral lug or extension 23 which is projected outwardly through a notch 24 provided therefor in said flange 17, and is adapted to enter an opening 25 in the outwardly offset portion 13 of the annular base member 11 of the body frame, said opening 25 being contiguous to the beaded marginal portion 15 of said base member 11. Projecting inwardly from the tongue 22 at the edge thereof opposite to that from which the lug 23 projects, is a handle extension 26 whose end portion 27 is bent at right angles thereto afford a grasping portion for convenience in withdrawing the lug 23 from the opening 25 in the base member 11, the lateral extension 26 of the latch member slidably engaging the under face of the bottom plate 16. In some cases, the inherent resilience of the tongue 22 may be depended upon to yieldably hold the latch member in normal position, but a supplemental leaf spring 28 is preferably provided in cooperative relation to said tongue 22, as shown more clearly in Fig. 5 of the drawing.

In the closed position of the bottom member 16, it is adapted to support a false bottom or removable tray 29, which latter, as shown, rests flatwise upon said bottom member 16 and is provided with an annular marginal flange 30 which fits rather snugly all around in freely slidable engagement with the inner face of the outwardly offset portion 13 of the base ring or annulus 11 of the body frame, said flange 30 being of such height that its marginal portion engages the internal annular shoulder 14 of the base member 11 when the bottom member 16 is in its closed position, as shown in Figs. 3 and 4 of the drawing. This removable false bottom or tray 29 is preferably enameled or otherwise treated to enhance the sanitary qualities thereof, and is readily removed from and replaced in the cage by merely releasing the latch device 21 and permitting the bottom 16 to drop to its limited open position.

Obviously, the structure may be modified considerably without departing from the spirit and scope of the invention as defined by the appended claims. The invention, therefore, is not limited to the specific construction and arrangement shown in the accompanying drawing.

Having thus described my invention, what I claim as new and desire to secure by Letters Patent is:

1. A bird cage having an annular base member, an annularly flanged bottom plate removably fitted in said base member, means for hingedly supporting said bottom member comprising studs insertable through alined apertures in said base member and the flange of said bottom member, and a retaining wire inserted through transverse apertures in said studs adjacent to the inner side of the flange of said bottom member, and means for releasably latching said bottom member in closed position.

2. In a bird cage, an annular base member, said base member having an outwardly offset lower portion and an internal annular shoulder, a bottom member having a marginal flange and being fitted movably within said base member, means for hingedly supporting said bottom in said base member comprising studs inserted through registered apertures in said base member and the marginal flange of said bottom member, and a retaining wire inserted through transverse apertures provided therefor in said studs adjacent to the inner face of the marginal flange of said bottom member, latch means for releasably holding said bottom member in normal closed position, and a false bottom comprising a removable tray having a marginal flange, said tray being supported on said bottom member and having its marginal flange retained between said bottom member and the internal annular flange of said base member.

3. In a bird cage, an annular base member, a bottom member having a marginal flange, means for hingedly supporting said bottom member within the base member comprising studs inserted through registered apertures in the base member and the marginal flange of said bottom member, and a wire extended through transverse apertures provided therefor in said studs adjacent to the inner face of the marginal flange of said bottom member, and a latch device comprising a leaf secured at one end to the inner side of the marginal flange of said bottom member and being yieldably held in engagement therewith, said leaf having an outwardly extending projection engageable in an opening provided therefor in said annular base member, said leaf having an inwardly extending lateral portion affording a handle for said latch device.

In testimony whereof I have signed my name to this specification.

ANTON M. KROCZEK.